United States Patent
Palin et al.

(10) Patent No.: US 12,413,952 B2
(45) Date of Patent: *Sep. 9, 2025

(54) METHOD AND APPARATUS FOR LOW ENERGY DISCOVERY

(71) Applicant: NOKIA TECHNOLOGIES OY, Espoo (FI)

(72) Inventors: Arto Palin, Viiala (FI); Jukka Reunamaki, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,813

(22) Filed: Sep. 27, 2022

(65) Prior Publication Data

US 2023/0016915 A1    Jan. 19, 2023

Related U.S. Application Data

(63) Continuation of application No. 16/999,852, filed on Aug. 21, 2020, now Pat. No. 11,611,863, which is a
(Continued)

(51) Int. Cl.
*H04W 8/00* (2009.01)
*H04W 76/10* (2018.01)

(52) U.S. Cl.
CPC ............ *H04W 8/005* (2013.01); *H04W 76/10* (2018.02)

(58) Field of Classification Search
CPC ....... H04W 8/005; H04W 76/10; Y02D 30/70
See application file for complete search history.

(56) References Cited

U.S. PATENT DOCUMENTS

| 8,140,403 B2 | 3/2012 | Ramalingam et al. |
| 8,156,337 B2 | 4/2012 | Balfanz et al. |

(Continued)

FOREIGN PATENT DOCUMENTS

| EP | 1760955 A1 | 3/2007 |
| EP | 2015606 A1 | 1/2009 |

(Continued)

OTHER PUBLICATIONS

Advisory Action for U.S. Appl. No. 13/710,115 dated Jul. 25, 2018.
(Continued)

*Primary Examiner* — Derrick W Ferris
*Assistant Examiner* — M Mostazir Rahman
(74) *Attorney, Agent, or Firm* — ALSTON & BIRD LLP

(57) ABSTRACT

A method, apparatus and computer program product are provided for facilitating efficient device discovery. In regards to a method implemented by a master device, a first identifier is received from a remote source. The method also receives one or more wireless device discovery packets comprising a second identifier from a proximate device, wherein the wireless device discovery packet comprises information compliant with a short-range communication technology to advertise presence of the proximate device or information compliant with a short-range communication technology to scan for proximate devices according to proximity-based communication technology. The method then, causes, in an instance in which at least the portion of the first identifier matches at least the portion of the second identifier, a wireless short-range communication connection procedure to be initiated between the apparatus and the proximate device, wherein the wireless short-range communication connection procedure complies with the proximity-based communication technology.

33 Claims, 9 Drawing Sheets

Related U.S. Application Data continuation of application No. 13/710,115, filed on Dec. 10, 2012, now Pat. No. 10,785,630.

(56) References Cited

U.S. PATENT DOCUMENTS

| | | | |
|---|---|---|---|
| 8,224,978 | B2 | 7/2012 | Driscoll et al. |
| 8,494,007 | B2 | 7/2013 | Li et al. |
| 8,554,141 | B2 | 10/2013 | Desai et al. |
| 8,626,144 | B2 | 1/2014 | Talty et al. |
| 8,683,595 | B1* | 3/2014 | Barker .................. G06F 21/51 |
| | | | 380/270 |
| 8,903,315 | B2 | 12/2014 | Pering et al. |
| 9,003,496 | B2 | 4/2015 | Lessiak et al. |
| 9,706,496 | B2 | 7/2017 | Polo et al. |
| 9,959,750 | B2 | 5/2018 | Lee et al. |
| 2004/0003133 | A1* | 1/2004 | Pradhan ............... H04W 48/08 |
| | | | 719/318 |
| 2004/0015693 | A1 | 1/2004 | Kitazumi |
| 2006/0268896 | A1 | 11/2006 | Kotola et al. |
| 2008/0002634 | A1 | 1/2008 | Mock et al. |
| 2008/0046555 | A1 | 2/2008 | Datta et al. |
| 2009/0016249 | A1 | 1/2009 | Li et al. |
| 2009/0239467 | A1 | 9/2009 | Gulin et al. |
| 2009/0285119 | A1 | 11/2009 | Horn et al. |
| 2009/0327391 | A1 | 12/2009 | Park et al. |
| 2010/0063889 | A1 | 3/2010 | Proctor, Jr. et al. |
| 2010/0235429 | A1 | 9/2010 | Simonen et al. |
| 2010/0257239 | A1 | 10/2010 | Roberts |
| 2010/0317289 | A1* | 12/2010 | Desai .................. H04B 17/318 |
| | | | 455/41.2 |
| 2011/0007639 | A1 | 1/2011 | Richardson |
| 2011/0021142 | A1 | 1/2011 | Desai et al. |
| 2011/0112969 | A1 | 5/2011 | Zaid et al. |
| 2011/0156640 | A1 | 6/2011 | Moshfeghi |
| 2012/0057456 | A1 | 3/2012 | Bogatin et al. |
| 2012/0072861 | A1* | 3/2012 | Tuli ..................... G06F 3/0481 |
| | | | 715/767 |
| 2012/0079086 | A1 | 3/2012 | Miettinen |
| 2012/0209910 | A1 | 8/2012 | Svendsen et al. |
| 2012/0238216 | A1 | 9/2012 | Hallowell et al. |
| 2012/0244810 | A1 | 9/2012 | Klos et al. |
| 2012/0258665 | A1 | 10/2012 | Sip |
| 2012/0306622 | A1 | 12/2012 | Trinh et al. |
| 2012/0331286 | A1* | 12/2012 | Choi .................. H04W 12/084 |
| | | | 713/156 |
| 2013/0065584 | A1 | 3/2013 | Lyon et al. |
| 2013/0109314 | A1* | 5/2013 | Kneckt .................. H04W 4/80 |
| | | | 455/41.2 |
| 2013/0165044 | A1* | 6/2013 | Xie ..................... H04W 8/005 |
| | | | 455/41.2 |
| 2013/0259230 | A1 | 10/2013 | Polo et al. |
| 2013/0281084 | A1 | 10/2013 | Batada et al. |
| 2013/0325924 | A1* | 12/2013 | Moshfeghi ............. H04L 67/12 |
| | | | 709/203 |
| 2014/0012917 | A1* | 1/2014 | Baca .................. H04M 1/0202 |
| | | | 709/204 |
| 2014/0113558 | A1 | 4/2014 | Varoglu et al. |
| 2014/0148094 | A1 | 5/2014 | Park et al. |
| 2014/0156036 | A1* | 6/2014 | Huang .................. G06V 40/23 |
| | | | 700/91 |

FOREIGN PATENT DOCUMENTS

| | | |
|---|---|---|
| GB | 2449510 A | 11/2008 |
| JP | 2007-166191 A | 6/2007 |
| WO | WO 2013/141764 A1 | 9/2013 |
| WO | WO 2014/070058 A1 | 5/2014 |

OTHER PUBLICATIONS

Notice of Allowance for U.S. Appl. No. 13/710,115 dated May 11, 2020.
Office Action for U.S. Appl. No. 13/710,115 dated Apr. 26, 2019.
Office Action for U.S. Appl. No. 13/710,115 dated Aug. 24, 2017.
Office Action for U.S. Appl. No. 13/710,115 dated Feb. 23, 2015.
Office Action for U.S. Appl. No. 13/710,115 dated Mar. 28, 2018.
Office Action for U.S. Appl. No. 13/710,115 dated Oct. 26, 2015.
Office Action for U.S. Appl. No. 13/710,115 dated Sep. 19, 2018.
Office Action for U.S. Appl. No. 13/710,115 dated Sep. 22, 2016.
Office Action for U.S. Appl. No. 13/710,115 dated Sep. 23, 2019.
Non-Final Office Action for U.S. Appl. No. 16/999,852 dated Mar. 17, 2022.
Notice of Allowance for U.S. Appl. No. 16/999,852 dated Jun. 27, 2022.
Notice of Allowance for U.S. Appl. No. 16/999,852 dated Oct. 4, 2022.
Han et al., "eDiscovery: Energy efficient device discovery for mobile opportunistic communications", 2012 20th IEEE International Conference on Network Protocols (ICNP), (Oct. 30-Nov. 2, 2012), 10 pages.
"Project: IEEE P802.15 Working Group for Wireless Personal Area Networks (WPANs)", doc.: IEEE 802.15-11-0826-01-0006, (Nov. 2011), 29 pages.
Gomez et al., "Overview and Evaluation of Bluetooth Low Energy: An Emerging Low-Power Wireless Technology", Sensors, vol. 12, (Aug. 29, 2012), 20 pages.
Haatanen, M., "Self-Organizing Routing Protocol for Bluetooth Low Energy Sensor Networks", Information Technology and Telecommunications, Oulu University of Applied Sciences, (2012), 37 pages.
Riemer, T., "Mobile robot control using Bluetooth Low Energy", Thesis for the Degree Program B.Sc. European Computer Science at Turku University of Applied Sciences & Hochschule für Angewandte Wissenschaften Hamburg, (Jun. 25, 2012), 42 pages.
Siep, T., "IEEE 802.11 and Bluetooth Technology: Natural Allies", IEEE 802.11-10/1331r0, (Nov. 2010), 8 pages.

* cited by examiner

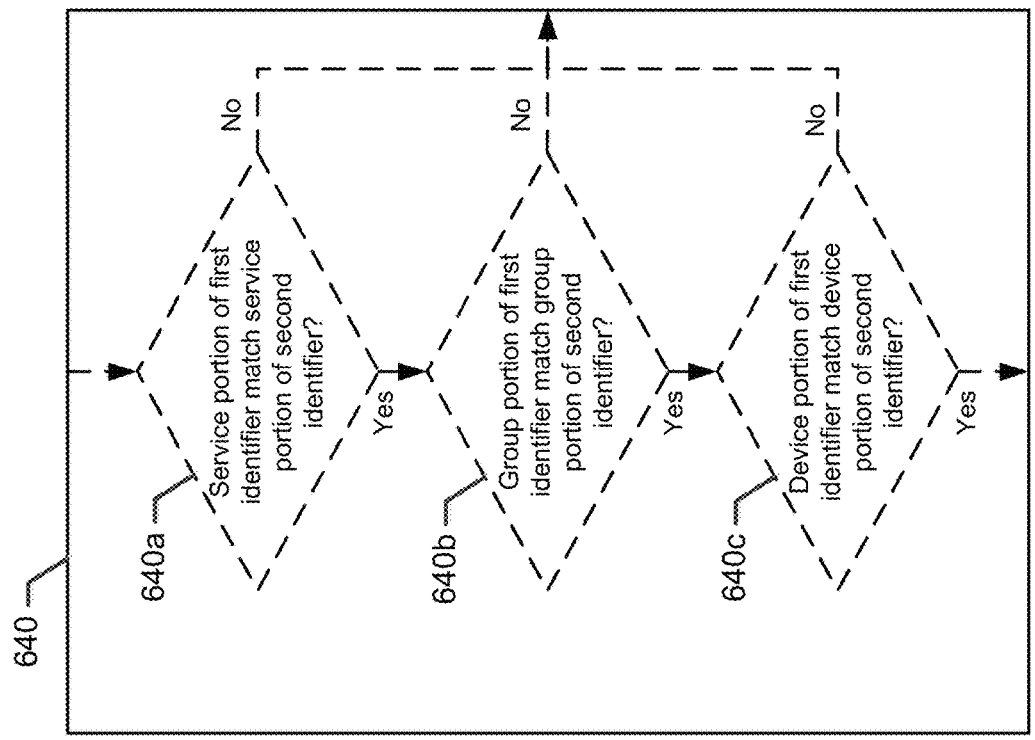
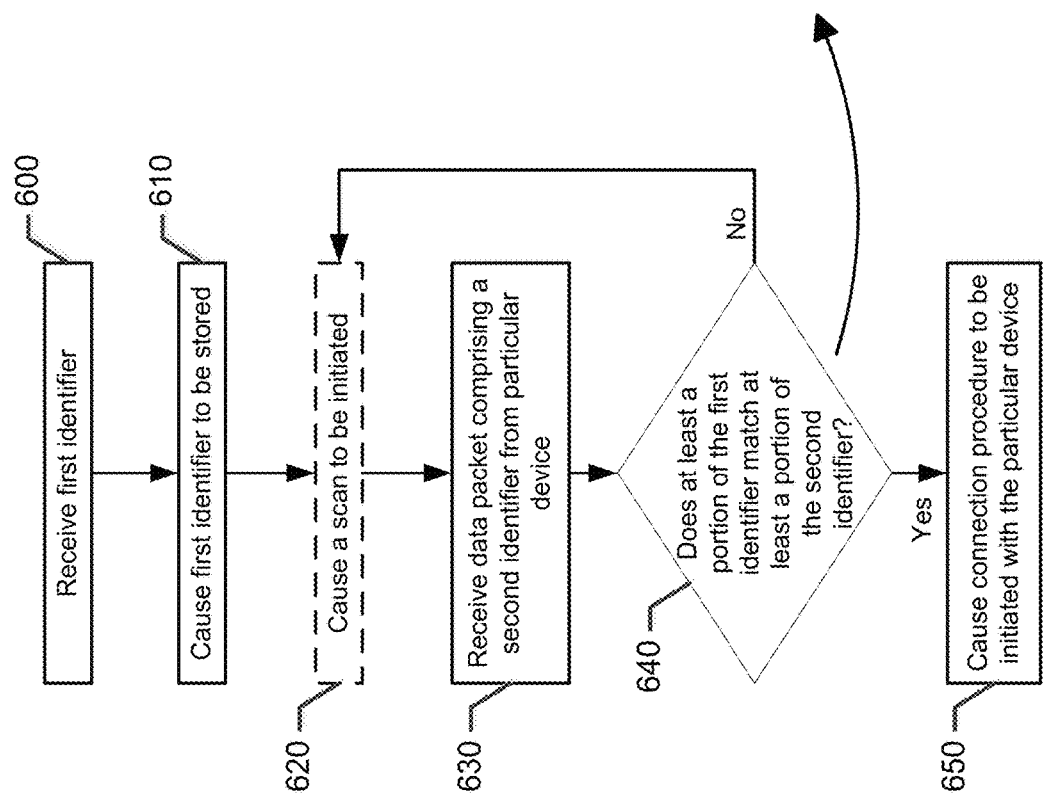
Figure 6b
Figure 6a

METHOD AND APPARATUS FOR LOW ENERGY DISCOVERY

CROSS-REFERENCE TO RELATED APPLICATIONS

This application is a continuation of U.S. application Ser. No. 16/999,852, filed Aug. 21, 2020, which is a continuation of U.S. application Ser. No. 13/710,115, filed Dec. 10, 2012, the contents of which are incorporated by reference herein in their entirety.

TECHNOLOGICAL FIELD

An example embodiment of the present invention relates generally to device discovery and, more particularly, to the use of identifiers in conjunction with low energy device discovery.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices a number of areas capable of enabling entirely new types of communication applications have emerged.

Bluetooth is an example of a wireless communication technology for exchanging data over short distances and may be utilized to connect two or more devices for communication therebetween. Bluetooth low energy (BTLE) is a feature of current Bluetooth technology which provides low-power and low-latency device connections. As with normal Bluetooth connections, BTLE connections rely on device discovery.

Current BTLE device discovery techniques are problematic. Many Bluetooth devices with BTLE capabilities use random static addresses which may change relatively frequently. For example, devices may change their random static addresses once per power cycle and many devices may change their random static addresses even more frequently than that. These frequent address changes make power efficient device discovery difficult. Because devices may not be able to be identified by a static address, it is impossible to selectively connect to any specific device. Instead, determining whether certain devices are nearby and available for connection can involve connecting with and investigating every single device in the vicinity.

BRIEF SUMMARY

A method, apparatus and computer program product are provided according to an example embodiment for facilitating efficient device discovery. In this regard, the method, apparatus and computer program product of an example embodiment may provide for device discovery in a manner that reduces or even eliminates the need to connect with and investigate all devices in the vicinity. Consequently, the method, apparatus and computer program product of an example embodiment may reduce transmissions and therefore power consumption while still providing for device discovery.

In one embodiment, a method is provided that includes a first identifier from a remote source, wherein the first identifier is associated with a group of devices, receiving one or more wireless device discovery packets comprising a second identifier from a proximate device, wherein the wireless device discovery packet comprises information compliant with a short-range communication technology to advertise presence of the proximate device or information compliant with a short-range communication technology to scan for proximate devices according to proximity-based communication technology, and determining whether at least a portion of the first identifier received from the remote source matches at least a portion of the second identifier received from the proximate device. The method further includes causing a wireless short-range communication connection procedure to be initiated between the apparatus and the proximate device, wherein the wireless short-range communication connection procedure complies with the proximity-based communication technology in which at least the portion of the first identifier matches at least the portion of the second identifier.

In another embodiment, an apparatus is provided that includes at least one processor and at least one memory including computer program code with the at least one memory and the computer program code configured to, with the at least one processor, cause the apparatus at least to receive a first identifier from a remote source, wherein the first identifier is associated with a group of devices, receive one or more wireless device discovery packets comprising a second identifier from a proximate device, wherein the wireless device discovery packet comprises information compliant with a short-range communication technology to advertise presence of the proximate device or information compliant with a short-range communication technology to scan for proximate devices according to proximity-based communication technology, and determine whether at least a portion of the first identifier received from the remote source matches at least a portion of the second identifier received from the proximate device. The apparatus is further caused to a wireless short-range communication connection procedure to be initiated between the apparatus and the proximate device, wherein the wireless short-range communication connection procedure complies with the proximity-based communication technology in an instance in which at least the portion of the first identifier matches at least the portion of the second identifier.

In a further embodiment, a computer program product is provided that includes a non-transitory computer-readable storage medium having program code portions embodied therein, the program code portions being configured to, upon execution, case an apparatus to at least receive a first identifier from a remote source, wherein the first identifier is associated with a group of devices, receive one or more wireless device discovery packets comprising a second identifier from a proximate device, wherein the wireless device discovery packet comprises information compliant with a short-range communication technology to advertise presence of the proximate device or information compliant with a short-range communication technology to scan for proximate devices according to proximity-based communication technology, and determine whether at least a portion of the first identifier received from the remote source matches at least a portion of the second identifier received from the proximate device. The program code portions are further configured to, upon execution, cause the apparatus to cause a wireless short-range communication connection procedure to be initiated between the apparatus and the proximate device, wherein the wireless short-range communication connection procedure complies with the proximity-based communication technology in an instance in which at least the portion of the first identifier matches at least the portion of the second identifier.

In yet another embodiment, an apparatus is provided that includes means for a first identifier from a remote source, wherein the first identifier is associated with a group of devices, means for receiving one or more wireless device discovery packets comprising a second identifier from a proximate device, wherein the wireless device discovery packet comprises information compliant with a short-range communication technology to advertise presence of the proximate device or information compliant with a short-range communication technology to scan for proximate devices according to proximity-based communication technology, and means for determining whether at least a portion of the first identifier received from the remote source matches at least a portion of the second identifier received from the proximate device. The apparatus further includes means for causing a wireless short-range communication connection procedure to be initiated between the apparatus and the proximate device, wherein the wireless short-range communication connection procedure complies with the proximity-based communication technology in an instance in which at least the portion of the first identifier matches at least the portion of the second identifier.

In one embodiment, a method is provided that includes generating an identifier, causing the identifier to be transmitted to a remote source, causing a wireless short-range communication packet comprising the identifier to be transmitted to a second device, the second device having previously received the identifier from the remote source, and receiving a wireless short-range communication connection request from the second device.

In another embodiment, an apparatus is provided that includes at least one processor and at least one memory including computer program code configured to, with the at least one processor, cause the apparatus at least to generate an identifier, cause the identifier to be transmitted to a remote source, cause a wireless short-range communication packet comprising the identifier to be transmitted to a second device, the second device having previously received the identifier from the remote source, and receive a wireless short-range communication connection request from the second device.

In a further embodiment, a computer program product is provided that includes a non-transitory computer-readable storage medium having program code portions embodied therein, the program code portions being configured to, upon execution, case an apparatus to at least generate an identifier, cause the identifier to be transmitted to a remote source, cause a wireless short-range communication packet comprising the identifier to be transmitted to a second device, the second device having previously received the identifier from the remote source, and receive a wireless short-range communication connection request from the second device.

In yet another embodiment, an apparatus is provided that includes means for generating an identifier, means for causing the identifier to be transmitted to a remote source, means for causing a wireless short-range communication packet comprising the identifier to be transmitted to a second device, the second device having previously received the identifier from the remote source, and means for receiving a wireless short-range communication connection request from the second device.

BRIEF DESCRIPTION OF THE DRAWINGS

Figure 1A:
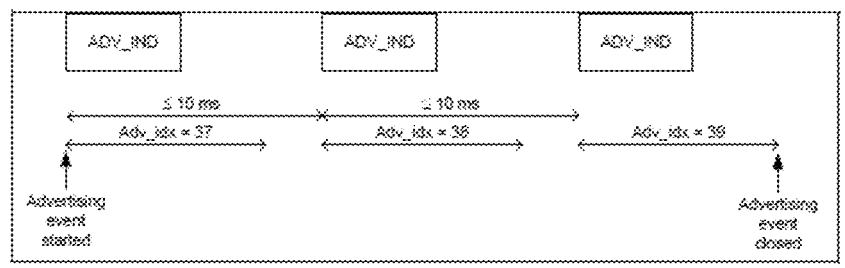
Figure 1B:
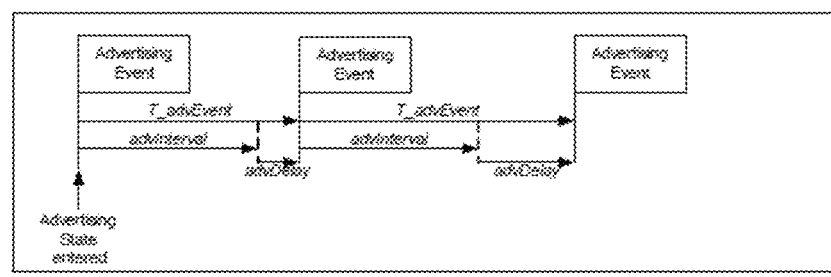
Figure 1C:
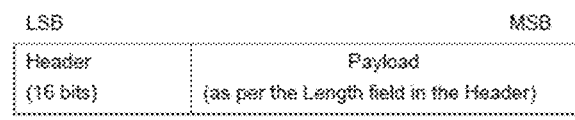
Figure 2:
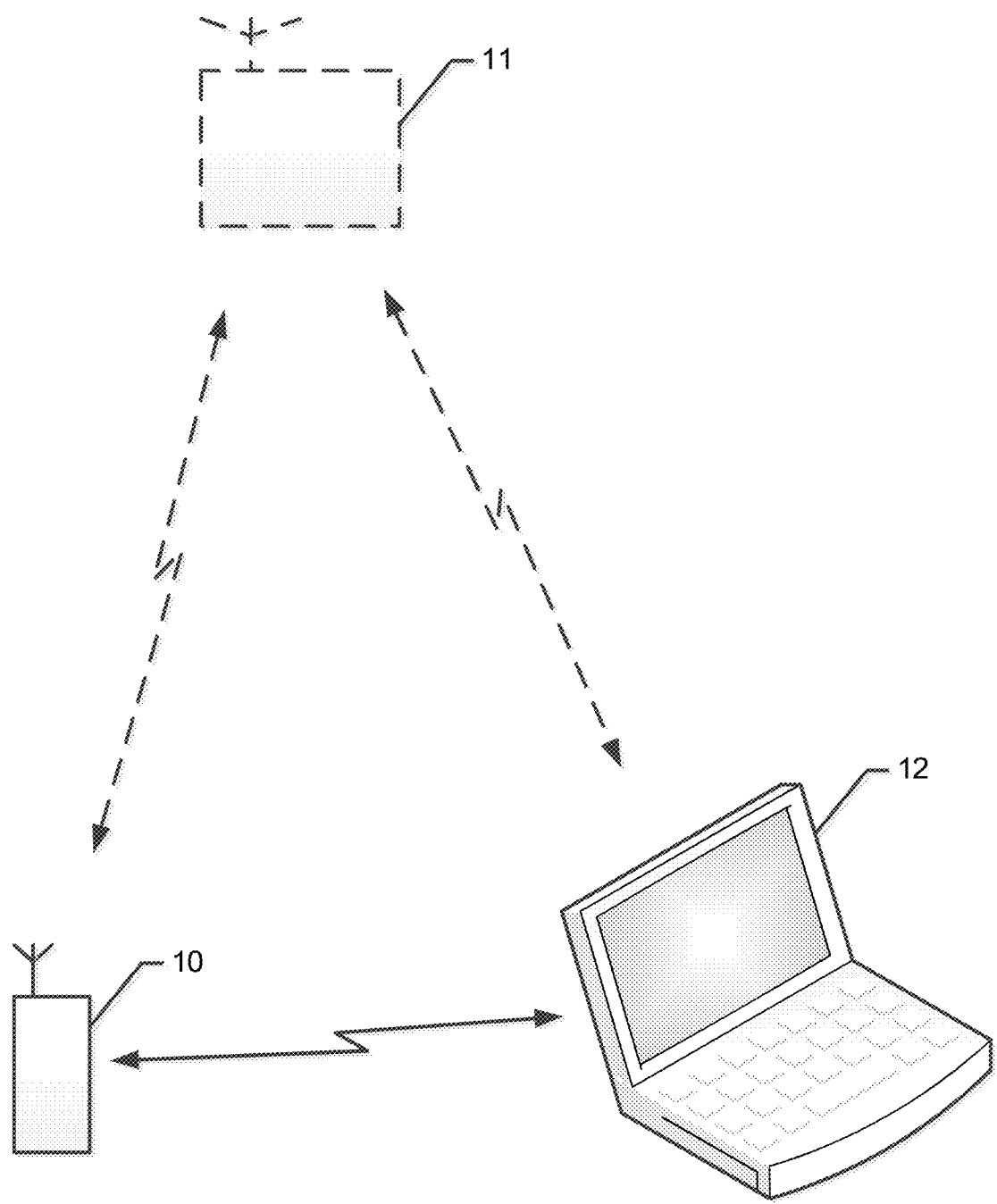
Figure 3:
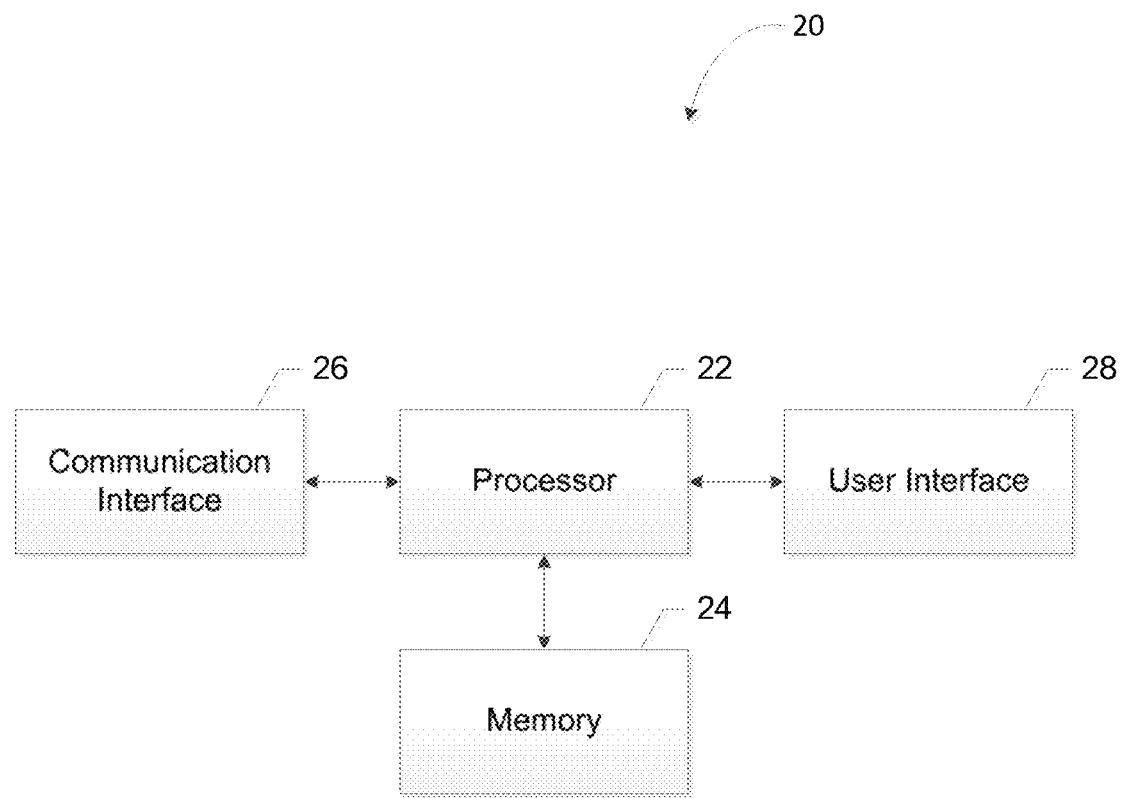
Figure 4:
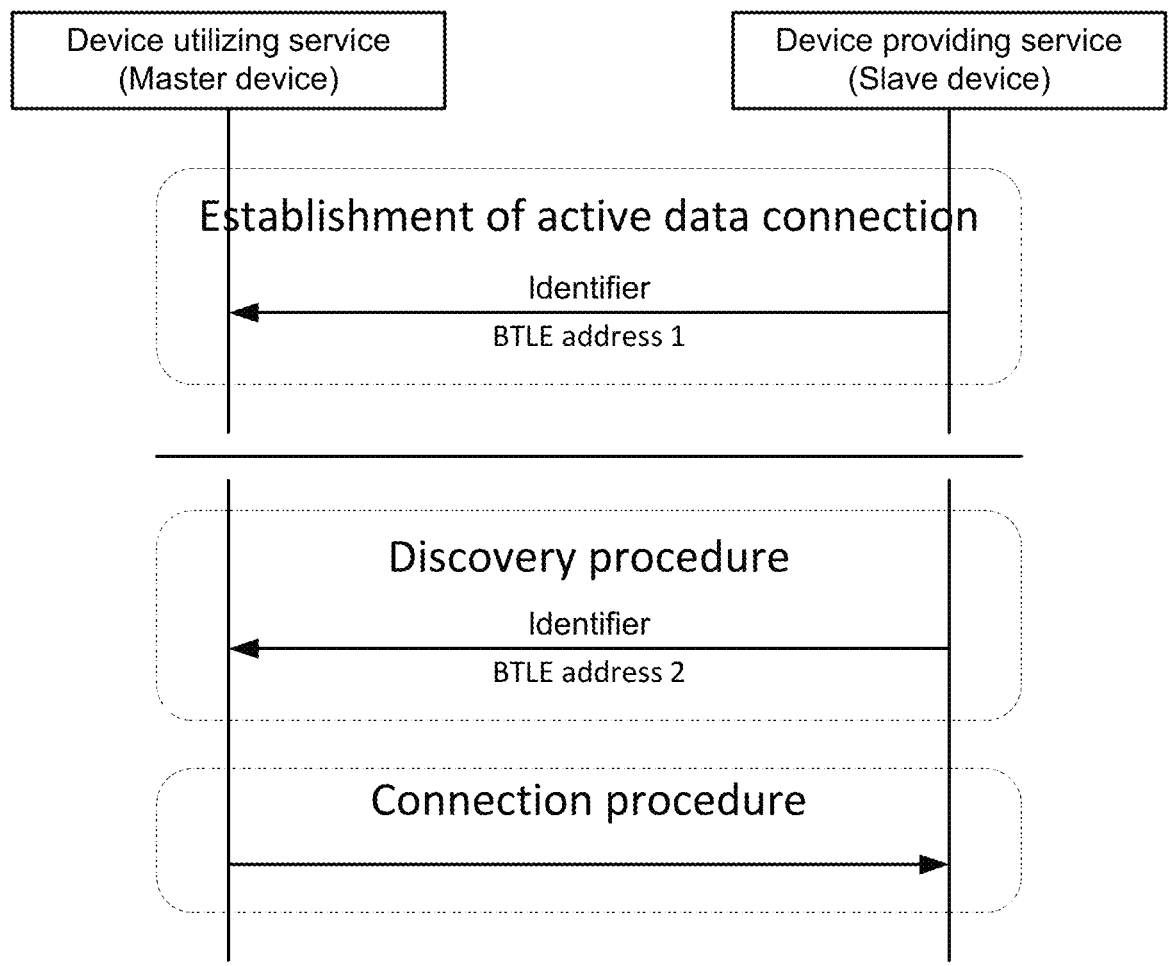
Figure 5:
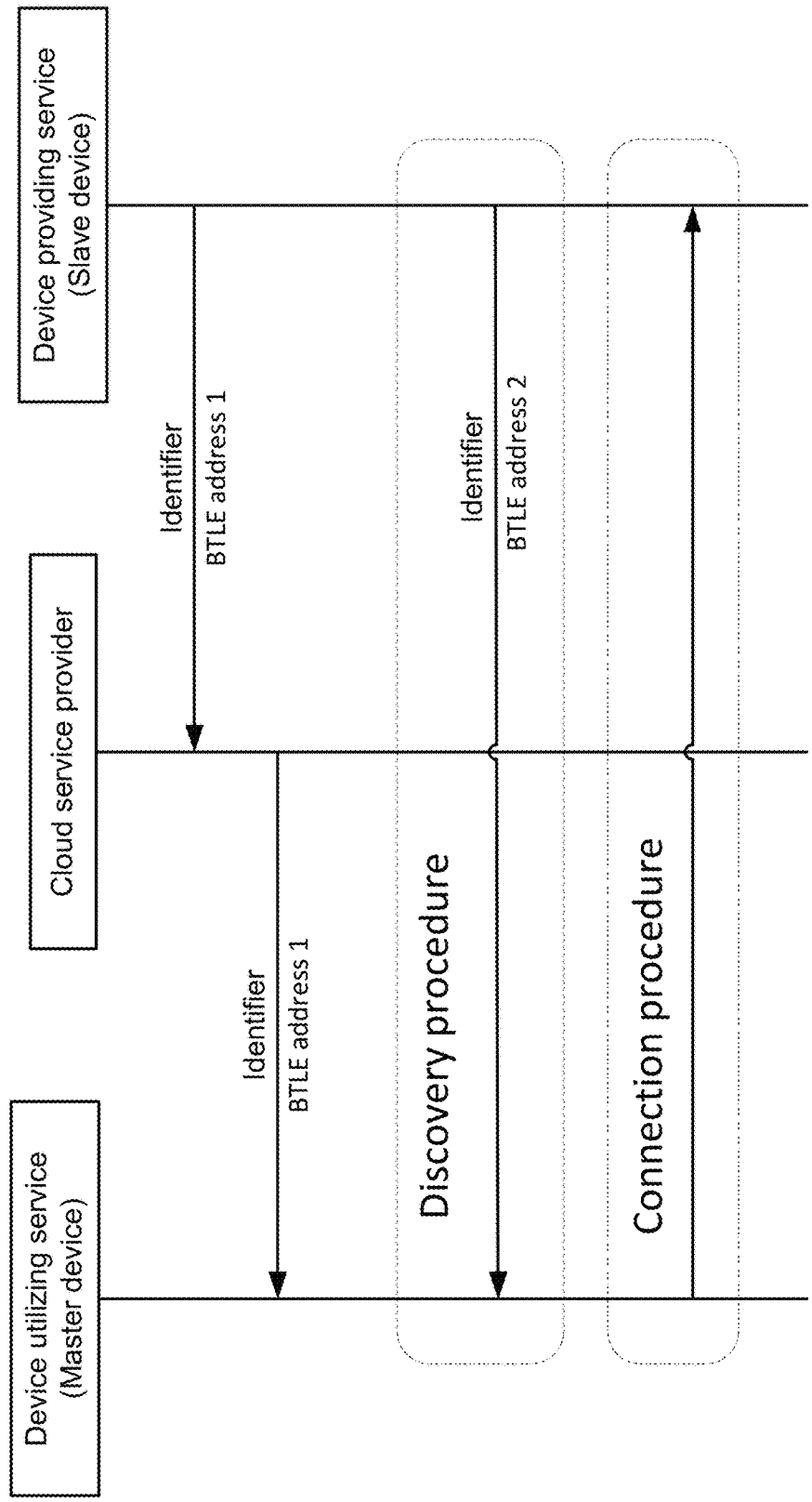
Figure 7:
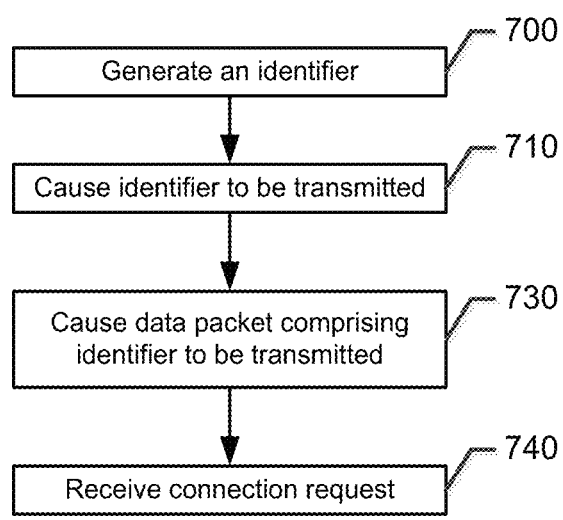
Figure 8:
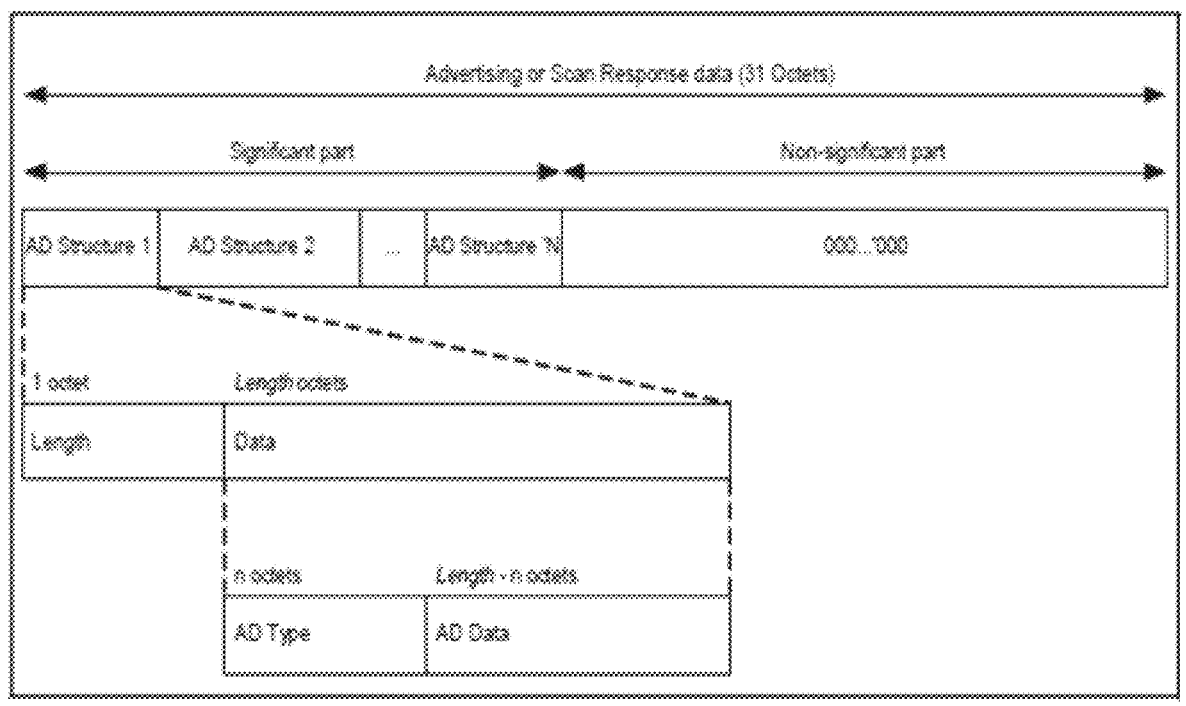
Figure 9:
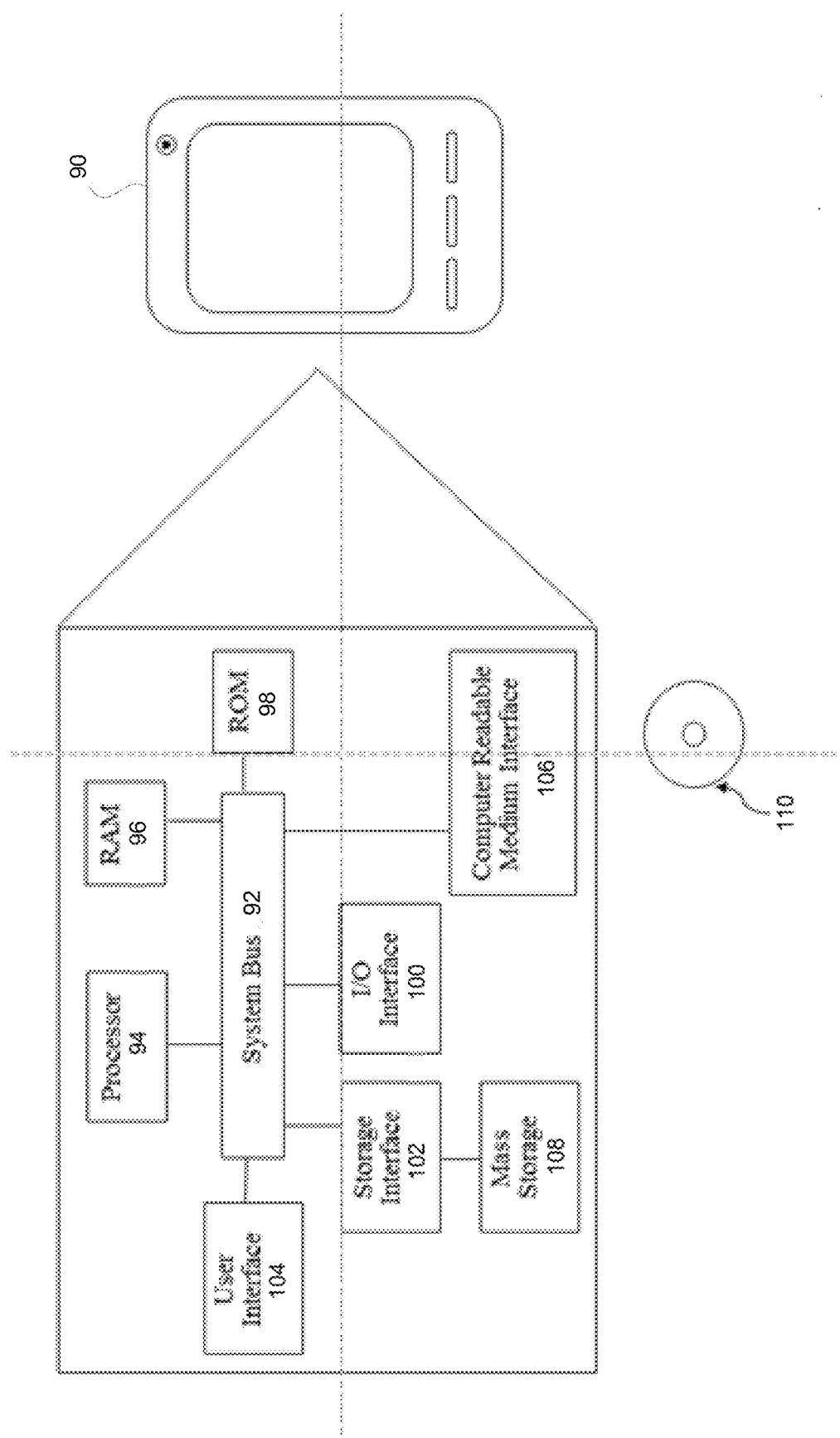

Having thus described example embodiments of the present disclosure in general terms, reference will now be made to the accompanying drawings, which are not necessarily drawn to scale, and wherein:

FIGS. 1a, 1b, and 1c are timing diagram relating to Bluetooth Low Energy discovery from Version 4.0 of the Bluetooth Core Specification;

FIG. 2 illustrates a pair of devices in proximity to one another that are capable of being discovered, such as in accordance with a Bluetooth device discovery scheme;

FIG. 3 is a block diagram of an apparatus that may be specifically configured in accordance with an example embodiment of the present invention and that may be embodied by either a master device seeking to discover other devices or a slave device to be discovered;

FIG. 4 is a signaling diagram illustrating a device discovery process in accordance with an example embodiment of the present invention;

FIG. 5 is a signaling diagram illustrating a device discovery process in accordance with another example embodiment of the present invention;

FIGS. 6a and 6b are flow charts illustrating the operations to be performed by an apparatus embodied by a master device in accordance with an example embodiment of the present invention;

FIG. 7 is a flow chart illustrating the operations to be performed by an apparatus embodied by a slave device in accordance with an example embodiment of the present invention;

FIG. 8 is an example of a format that may be utilized in accordance with advertising data and/or scan response data in accordance with an example embodiment of the present invention; and FIG. 9 is a representation of a computer that may be specifically configured in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory, physical storage medium (e.g., volatile or non-volatile memory device), can be differentiated from a "computer-readable transmission medium," which refers to an electromagnetic signal.

A method, apparatus and computer program product of an example embodiment may provide for device discovery, such as to enable the discovery of devices in proximity to one another. In this regard, the method, apparatus and computer program product of an example embodiment will be described in conjunction with the discovery of Bluetooth devices. However, the method, apparatus and computer program product may be employed in conjunction with devices configured to communicate in accordance with other protocols including, but not limited, to device discovery associated with a WLAN, WiFi or the like. As such, reference to the Bluetooth protocol herein is provided by way of an example, but not of limitation.

By way of background, BTLE device discovery is based on searching for advertising packets sent by a first device over dedicated advertising channels. The advertising packets are sent in an Advertising event, which consists of one or more advertising packets being sent over each of the used advertising channels (one packet per channel), as shown in FIG. 1a. The time difference between Advertising events includes a constant Advertising interval and a random advertising delay as shown in FIG. 1b. In addition to preamble, access address, and CRC, packets sent in the advertising channel contain an advertising channel protocol data unit (PDU), which includes a 16-bit header and variable size payload as shown in FIG. 1c. The payload of the advertising channel PDU consists of at least an advertising device identifier which can be public or random (the type is indicated in the Header field). The public address is the real address of the device, while the random address is used for privacy. The random address can be a static or a private. The static address is randomly generated and shall not change its value until the device is power cycled. The private address can be changed more often and it can be either resolvable or non-resolvable. The non-resolvable private address is like static address, i.e. the true identity cannot be solved from the address. The resolvable address on the other hand can be "solved" if the shared secret is known.

Referring now to FIG. 2, a pair of devices are in proximity to one another such that a first device may discover a second device as discussed above and, as such, establish communications therebetween. Various types of devices may discover one another and thereafter communicate with one another including, for example, various types of fixed terminals, such as a personal computer, a computer workstation or the like, and various types of mobile terminals, such as a portable computing device, e.g., a laptop computer or a tablet computer, a mobile telephone, a personal digital assistant (PDA), a universal serial bus (USB) or other dongle, a personal computer (PC) emulator card, a pager, a mobile television, a gaming device, an electronic book reader, a camera, an audio/video player, a radio, a global positioning system (GPS) device, or any combination of the aforementioned, and other types of communications devices. The devices engaged in device discovery may be of the same type, or may be different types of devices as shown in FIG. 2 in regards to a mobile telephone 10 and a laptop computer 12. Additionally, while two devices are shown in FIG. 2 to be engaged in device discovery, the method, apparatus and computer program product of one embodiment may be equally applicable to device discovery involving three or more devices in other embodiments. A remote device 11 is also depicted in FIG. 2. The remote device 11 may, for example, comprise a network entity such as a server, and/or a device configured, for example, to provide or be accessed via a cloud service. The remote device 11 may be in communication with either or both of devices 10 and 12 via any suitable wired or wireless communication means.

In the following discussion, a first or master device will be described to be conducting the discovery procedure in an effort to discover one or more other devices, e.g., one or more proximate devices, that may be providing one or more services. A second or slave device will be a device, e.g., a proximate device, to be discovered, such as by the first device, and may provide the one or more services to the first or master device. While some devices may be specifically configured to be a master device that endeavors to discover other devices and other devices may be specifically configured to be a slave device that is to be discovered, still other devices may be configured to alternatively function as either a master device or a slave device.

As noted above, a variety of devices may engage in a device discovery process in advance of establishing communications therebetween. The devices that engage in device discovery, including a master device that is conducting the device discovery process in order to discover other devices and a slave device that is to be discovered, may include, embody or otherwise be associated with an apparatus 20 that may be specifically configured in accordance with an example embodiment to the present invention as discussed hereinafter. An example embodiment of such an apparatus will now be described with reference to FIG. 3. It should be noted, however, that the devices or elements described below may not be mandatory and thus some may be omitted in certain embodiments. Referring now to FIG. 3, the apparatus of the illustrated embodiment may include or otherwise be in communication with a processor 22, a memory device 24, a communication interface 26 and a user interface 28. The memory device may comprise, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, applications, instructions or the like for enabling the apparatus to carry out various functions in accordance with one or more example embodiments of the present invention. For example, the memory device could be configured to buffer input data for processing by the processor. Additionally or alternatively, the memory device could be configured to store instructions for execution by the processor.

The apparatus 20 may, in some embodiments, be a mobile or a fixed terminal as described above. However, in some embodiments, the apparatus may be embodied as a chip or chip set (which may in turn be employed at one of the devices mentioned above). In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry comprised thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may comprise one or more processing cores configured to perform independently. A multi-core processor may enable multiprocessing within a single physical package. Additionally or alternatively, the processor may comprise one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a computing device) adapted for employing an embodiment of the present invention by further configuration of the processor by instructions for performing the algorithms and/or operations described herein. The processor may comprise, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to other devices. In this regard, the communication interface may comprise, for example, an antenna (or multiple antennas) and supporting hardware and/or software for enabling communications with a wireless communication network, e.g., WLAN. As such, for example, the communication interface may comprise a communication modem and/or other hardware/software for supporting communication via cable, digital subscriber line (DSL), USB or other mechanisms.

The user interface 28 may be in communication with the processor 22 to receive an indication of a user input at the user interface and/or to provide an audible, visual, mechanical or other output to the user. As such, the user interface may comprise, for example, a keyboard, a mouse, a joystick, a display, a touch screen(s), touch areas, soft keys, a microphone, a speaker, or other input/output mechanisms. For example, the user interface may comprise, among other devices or elements, any or all of a speaker, a microphone, a display, and a keyboard or the like. In this regard, for example, the processor may comprise user interface circuitry configured to control at least some functions of one or more elements of the user interface, such as, for example, a speaker, ringer, microphone, display, and/or the like. The processor and/or user interface circuitry comprising the processor may be configured to control one or more functions of one or more elements of the user interface through computer program instructions (e.g., software and/or firmware) stored on a memory accessible to the processor (e.g., memory device 24, and/or the like).

In order to provide for device discovery in a more consistent and power efficient manner, the method, apparatus and computer program product of an example embodiment may utilize an advertising channel as discussed above to provide in a data packet, such as an advertising packet or a scan response packet, an identifier that is, for example, associated with a service, one or more devices belonging to a certain group of devices, or a particular device. In one embodiment that supports device discovery for Bluetooth devices, the method, apparatus and computer program product may utilize Bluetooth Low Energy (BTLE) as a power efficient transport mechanism by which to provide the identifier. In this regard, BTLE is defined by the Bluetooth Core Specification Version 4.0 and includes forty physical channels with three of the channels being advertising channels and the remaining thirty-seven channels being data channels. A physical channel may be sub-divided into time units known as events. Data may be transmitted between the devices in packets that are positioned in the events. There are two types of events: advertising events and connection events.

In one embodiment, the slave device, also known as a source device, may transmit an advertisement, such as a low energy advertisement, including one or more packets, e.g., low energy packets, via an advertising channel. The advertisement may include, among other types of information, an identifier. The identifier may identify, for example, one or more services (e.g., one or more services provided at least in part by the slave device), a device group (e.g., a group of devices to which the slave device belongs), and/or a particular device (e.g., the slave device). According to examples in which the identifier identifies more than one aspect, the identifier may comprise multiple portions. For example, an identifier may have a service portion and a device group portion, such that the identifier identifies both a service and a device group. All other combinations are possible as well. The identifier may, for example, have been previously provided to the master device during a previous active data connection, such as upon or shortly after establishment of the active data connection, between the master and slave devices, as shown by FIG. 4. Thus, as shown, even if the BTLE address of the slave device is changed following the establishment of the active data connection process (e.g., from BTLE address 1 to BTLE address 2, as shown), the slave device may still be identified, e.g., discovered, based on the identifier. According to another example, the identifier may alternatively or additionally be provided to the master device via a cloud service, as shown by FIG. 5. The current BTLE address of the slave device may also, for example, be provided via the cloud service. As shown, and as is the case with the identifier being provided during an active data connection, the slave device may still be discovered based on the identifier even if the BTLE address changes.

By way of further explanation, reference is made to FIGS. 6a and 6b in which the operations performed by an apparatus 20 embodied by or otherwise associated with a master device are illustrated. In this embodiment, the apparatus embodied by the master device may include means, such as the processor 22, the memory 24, the communication interface 26 or the like, for receiving a first identifier, e.g., from a remote source such as the remote device 11 depicted in FIG. 2, and for causing the first identifier to be stored. See operations 600 and 610 of FIG. 6a. As discussed above, the first identifier may be received, for example, during a an active data connection with a slave device. According to another example embodiment, the first identifier may be received via a cloud service, such as from a network entity, e.g., a server or the like, configured to provide the cloud service. As noted above, the identifier may comprise one or more portions which may, for example, identify various aspects. For example, the first identifier may include one or more of: a service portion that identifies a service, a group portion which identifies a group of devices, and/or a device portion which identifies a particular individual device. According to another example embodiment, the format of the identifier may be random. According to a further example embodiment, the format of the identifier may be based on a mathematical calculation or algorithm and thus not be totally random. The identifier may, for example, comprise a universally unique identifier (UUID). Other information may also be received along with the identifier, such as a BTLE address, e.g., a current BTLE address of the particular device. According to an example embodiment, the identifier may occasionally be changed, such as periodically or upon the occurrence of certain events, e.g., to protect privacy. When the identifier is changed, the new identifier may, for example, be provided to the master device, such as via the cloud service or during a subsequent active data connection, as discussed above.

The apparatus 20 embodied by or otherwise associated with the master device may further include means, such as the processor 22, the memory 24, the communication interface 26 or the like, for causing a scan for a service, device group, and/or particular device to be initiated. See operation 620 of FIG. 6a.

The apparatus 20 embodied by or otherwise associated with the master device may further include means, such as the processor 22, the memory 24, the communication interface 26 or the like, for receiving a data packet, such as a wireless short-range communication packet, comprising a second identifier from a proximate device, e.g., from a slave device. See operation 630 of FIG. 6a. According to one example embodiment, the data packet may be an advertising packet. According to another example embodiment, the data packet may be a scan response packet. The data packet may, for example, be transmitted in response to the scan performed in operation 620.

The apparatus 20 embodied by or otherwise associated with the master device may further include means, such as the processor 22, the memory 24, the communication interface 26 or the like, for determining whether at least a portion of the received second identifier matches at least a portion of the stored first identifier. See operation 640 of FIG. 6a. For example, the apparatus 20 may determine whether there is a match between two of the identifier portions discussed above, such as a service portion of the first identifier and a service portion of the second identifier or a device group portion of the first identifier and a device group portion of the second identifier, etc. According to another example embodiment, the apparatus 20 may determine whether matches exist between multiple portions of the identifiers. For example, and with reference to FIG. 6b, the apparatus may determine whether there are matches between two or more of the three aforementioned portions, such as by determining whether a match exists between service portions, then device group portions, then device portions. See, e.g., operations 640a, 640b, and 640c. This may, according to other example embodiments, be done in any order and include any number of portions of the identifiers. According to yet another example embodiment, there may be a threshold number of portions which must match before a connection procedure may be initiated. That is, one portion, such as a service portion, may match, while another portion, such as a device or group portion, may not match, yet this may be sufficient for a connection procedure to be initiated. Other examples of how matches between one or more portions the first and second identifiers may be determined are also possible.

Referring again to FIG. 6a, the apparatus 20 embodied by or otherwise associated with the master device may further include means, such as the processor 22, the memory 24, the communication interface 26 or the like, for causing a connection procedure, such as a wireless short-range connection procedure, to be initiated with the particular device in an instance in which it is determined that there is a match between at least a portion of the first identifier and the second identifier. See operation 650. The connection procedure may be initiated and proceed in accordance with any communication technology or standards, such as, for example, Bluetooth, BTLE or the like.

Having thus described various operations of an apparatus 20 embodied by or otherwise associated with a master device, attention will now be turned to FIG. 7, in which operations from the perspective of an apparatus, such as the apparatus 20 of FIG. 3, embodied by or otherwise associated with a slave device are depicted. In this regard, the apparatus 20 may include means, such as the processor 22, the memory 24, the communication interface 26 or the like, for generating an identifier. See operation 700 of FIG. 7. The apparatus 20 may generate the identifier based on various aspects of the slave device such as, for example, on one or more services that the slave device is configured to provide, one or more device groups that the slave device belongs to, and/or an identity of the slave device. The identifier may be generated independently, e.g., by the apparatus 20 alone based on available information, or with input from another source, such as, for example, from a cloud service provider or another device.

The apparatus 20 embodied by or otherwise associated with the slave device may further include means, such as the processor 22, the memory 24, the communication interface 26 or the like, for causing the identifier to be transmitted. See operation 710 of FIG. 7. The apparatus 20 may, for example, cause the identifier to be transmitted to a network entity configured to be accessible via or provide a cloud service, such as a server or other device. According to another example embodiment, the apparatus 20 may cause the identifier to be transmitted to a master device during an active data connection with the master device, such as, for example, during or shortly after establishment of the active data connection. According to yet another example embodiment, the apparatus 20 may cause the identifier to be transmitted to a master device via another transmission technology, such as near field communication (NFC). As noted above, additional information may also be included with the identifier, such as a BTLE address, e.g., a current BTLE address, or the like.

The apparatus 20 embodied by or otherwise associated with the slave device may further include means, such as the processor 22, the memory 24, the communication interface 26 or the like, for causing a data packet comprising the identifier to be transmitted. See operation 730. The data packet may be transmitted at one or more predefined frequencies to devices in proximity thereto, such as to one or more master devices in proximity to the slave device. As discussed above, the data packet may, for example, comprise a scan response packet, an advertisement packet, or another type of packet. For example, the packet may be a BTLE scan response packet, e.g., a SCAN_RSP packet. A more detailed description of the format of a suitable data packet according to an example embodiment will be discussed below.

The apparatus 20 embodied by or otherwise associated with the slave device may further include means, such as the processor 22, the memory 24, the communication interface 26 or the like, for receiving a connection request. See operation 740. The connection request may be in accordance with any communication technology or standards, such as, for example, Bluetooth, BTLE or the like.

Turning now to FIG. 8, one example is depicted of a format that may be utilized for an advertisement and/or a scan response, e.g., an advertisement and/or a scan response which may include the data packet comprising the identifier discussed above, caused to be transmitted by an apparatus embodied by the slave device. In this embodiment, the data includes a significant part and a non-significant part. The significant part contains a sequence of advertisement (AD) structures. Each AD structure of this embodiment has a length field of one octet, which contains the length value, and a data field having a number of octets equal to the value of the length field. The first octet of the data field of this embodiment includes the AD type field. The content of the remaining octets in the data field depends on the value of the AD type field and may be referred to as AD data. The non-significant part extends the data to 31 octets and shall contain all zero octets. As such, only the significant part of the data needs to be transmitted. For example, in an instance in which the AD structures comprise an advertisement, the data may be transmitted in advertising events with the advertising data being placed in the ADV data field of ADV_IND, ADV_NONCONN_IND and/or ADV_SCAN_IND packets as defined by the Bluetooth Core Specification Version 4.0. Alternatively, in an instance in which the AD structures comprise a scan response, the scan response data may be sent to the ScanRspData field of the SCAN_RSP packets as also defined by the Bluetooth Core Specification Version 4.0.

In one example embodiment, the AD type may equal a list of available identifiers, such as a complete list of 128-bit UUIDs available, and one octet of the AD data, e.g., octet 16, may equal a device group portion, such as a group UUID. In another example embodiment, the AD type may equal a Service Solicitation and one octet of the AD data, e.g., octet 16, may equal a device group portion, such as a group UUID. In another example embodiment, the AD type may equal a Service Solicitation and one octet of the AD data, e.g., octet 16, may equal a device group portion, such as a group UUID. In another example embodiment, the AD type may contain Service Data, one octet of the AD data, e.g., octet 2, may equal a device group portion, such as a group UUID, and another octet of the AD data, e.g., octet 1, may equal one or more status flags. In another example embodiment, one or more octets, e.g., octets 1 through 6, may equal a service portion, e.g., a service ID, another one or more octets, e.g., octets 7 through 12, may equal a device group portion, e.g., a group ID, and another one or more octets, e.g., octets 13 through 16, may equal a particular device portion, e.g., a device ID.

As described above, FIGS. 6a, 6b, and 7 are flowcharts of a method, apparatus and program product from the perspective of a master device and a slave device, respectively, according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program code. In this regard, the computer program code which embodies the procedures described above may be stored by a memory device 24 of an apparatus 20 employing an embodiment of the present invention and executed by a processor 22 in the apparatus. As will be appreciated, any such computer program code may be loaded onto a computer or other programmable apparatus (e.g., hardware) to produce a machine, such that the resulting computer or other programmable apparatus embody a mechanism for implementing the functions specified in the flowchart blocks. This computer program code may also be stored in a non-transitory computer-readable storage memory (as opposed to a transmission medium such as a carrier wave or electromagnetic signal) that may direct a computer or other programmable apparatus to function in a particular manner, such that the code stored in the computer-readable memory produce an article of manufacture the execution of which implements the function specified in the flowchart blocks. The computer program code may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 6a, 6b, and 7, when executed, convert a computer or processing circuitry into a particular machine configured to perform an example embodiment of the present invention. Accordingly, the operations of FIGS. 6a, 6b, and 7 define an algorithm for configuring a computer or processing circuitry (e.g., processor) to perform an example embodiment. In some cases, a general purpose computer may be configured to perform the functions shown in FIGS. 6a, 6b, and 7 (e.g., via configuration of the processor), thereby transforming the general purpose computer into a particular machine configured to perform an example embodiment.

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions or operations, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order, including concurrently, and in any combination.

As described, various operations and/or the like described herein may be executed by and/or with the help of computers. Further, for example, devices described herein may be and/or may incorporate computers. The phrases "computer", "general purpose computer", "computing device" and the like, as used herein, refer but are not limited to a media device, a personal computer, an engineering workstation, a personal digital assistant, a portable computer, a computerized watch, a wired or wireless terminal, phone, node, and/or the like, a set-top box, a personal video recorder (PVR), an automatic teller machine (ATM), a game console, and/or the like.

Embodiments of the present invention may be implemented in software, hardware, application logic or a combination of software, hardware and application logic. The software, application logic and/or hardware may reside on memory 24 of apparatus 20 of FIG. 3. In an example embodiment, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 9. A computer-readable medium may comprise a computer-readable storage medium that may be any media or means that may contain or store the instructions for use by or in connection with an instruction execution system, apparatus, or device, such as a computer.

The phrases "general purpose computer", "computer", "computing device" and the like may also refer to one or more processors operatively connected to one or more memory or storage units, wherein the memory or storage may contain data, algorithms, and/or program code, and the processor or processors may execute the program code and/or manipulate the program code, data, and/or algorithms. Accordingly, example computer 90 as shown in FIG. 9 that may be considered as one embodiment of the apparatus 20 of FIG. 3 may include various hardware modules for causing the computer to implement one or more embodiments of the present invention. According to one example, the computer 90 include a system bus 92 which may operatively connect processor 94, random access memory (RAM) 96 and read-only memory (ROM) 98 that may store, for example, a computer code for the computer 90 to perform one or more of the example methods illustrated in FIGS. 6a, 6b, and 7. The system bus 92 may further operatively connect input output (I/O) interface 100, storage interface 102, user interface 104 and computer readable medium interface 106. Storage interface 102 may comprise or be connected to mass storage 108.

Mass storage 108 may be a hard drive, optical drive, or the like. Processor 94 may comprise a microcontroller unit (MCU), a digital signal processor (DSP), or any other kind of processor. Computer 90 as shown in this example also comprises a touch screen and keys operating in connection with the user interface 104. In various example embodiments, a mouse, and/or a keypad may alternately or additionally be employed. Computer 90 may additionally include the computer readable medium interface 106, which may be embodied by a card reader, a DVD drive, a floppy disk drive, and/or the like. Thus, media containing program code, for example for performing methods of FIGS. 6a, 6b, and 7, may be inserted for the purpose of loading the code onto the computer.

Computer 90 may run one or more software modules designed to perform one or more of the above-described operations. Corresponding program code may be stored on a physical media 110 such as, for example, DVD, CD-ROM, and/or floppy disk. It is noted that any described division of operations among particular software modules is for purposes of illustration, and that alternate divisions of operation may be employed. Accordingly, any operations discussed as being performed by a software module may instead be performed by a plurality of software modules. Similarly, any operations discussed as being performed by a plurality of modules may instead be performed by a single module. It is noted that operations disclosed as being performed by a particular computer may instead be performed by a plurality of computers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory storing computer program code, the at least one memory and the computer program code being configured to, with the at least one processor, cause the apparatus to at least:
receive a first identifier from a remote source comprising a server configured to provide cloud service for devices belonging to a group;
cause the first identifier to be stored;
receive a wireless short-range communication packet comprising a second identifier from a proximate device, wherein the wireless short-range communication packet comprises information compliant with Bluetooth Low Energy communication technology to advertise presence of the proximate device or information compliant with Bluetooth Low Energy communication technology to respond to a scan for proximate devices;
determine, based upon at least a portion of the first identifier received from the remote source and at least a portion of the second identifier received from the proximate device, whether the proximate device is identified as an individual device belonging to the group; and cause, in an instance in which said proximate device is identified as an individual device belonging to the group based upon at least the portion of the first identifier received from the remote source and at least the portion of the second identifier received from the proximate device, a wireless short-range communication connection procedure to be initiated between the apparatus and the proximate device, wherein the wireless short-range communication connection procedure complies with Bluetooth or Bluetooth Low Energy communication technology.

2. The apparatus according to claim 1, wherein the wireless short-range communication packet comprises information enabling the apparatus to initiate the wireless short-range communication connection procedure with the proximate device.

3. The apparatus according to claim 1, wherein the second identifier comprises a group portion associated with a group of devices with which the first identifier is associated.

4. The apparatus according to claim 1, wherein the second identifier comprises an identifier compliant with Bluetooth Low Energy communication technology.

5. The apparatus according to claim 4, wherein the second identifier received from the proximate device changes periodically or upon the occurrence of certain events.

6. The apparatus according to claim 4, wherein the second identifier comprises a Bluetooth Low Energy address.

7. The apparatus according to claim 6, wherein the memory and computer program code are further configured to, with the at least one processor, cause the apparatus to utilize at least one service from the proximate device over a wireless short-range communication connection established between the apparatus and the proximate device.

8. The apparatus according to claim 6, wherein the at least one service is available to one or more devices belonging to the group of devices.

9. The apparatus according to claim 1, wherein the memory and computer program code are further configured to, with the at least one processor, cause the apparatus to provide at least one service for the proximate device over a wireless short-range communication connection established between the apparatus and the proximate device.

10. The apparatus according to claim 9, wherein the at least one service is available to one or more devices belonging to the group of devices.

11. The apparatus according to claim 1, wherein the memory and computer program code are further configured to, with the at least one processor, cause the apparatus to determine whether at least a portion of the first identifier received from the remote source is able to be matched with at least a portion of the second identifier received from the proximate device in connection with determination whether the proximate device is identified as an individual device belonging to the group.

12. The apparatus according to claim 1, wherein the memory and computer program code are further configured to, with the at least one processor, cause the apparatus to receive from the proximate device a connection request in accordance with Bluetooth or Bluetooth Low Energy communication technology during initiation of the wireless short-range communication connection procedure between the apparatus and the proximate device.

13. The apparatus according to claim 1 comprising one of a mobile telephone, a laptop computer, a tablet computer, a personal computer, or a gaming device.

14. A method comprising:

receiving a first identifier from a remote source comprising a server configured to provide cloud service for devices belonging to a group;

causing the first identifier to be stored;

receiving a wireless short-range communication packet comprising a second identifier from a proximate device, wherein the wireless short-range communication packet comprises information compliant with Bluetooth Low Energy communication technology to advertise presence of the proximate device or information compliant with Bluetooth Low Energy communication technology to respond to a scan for proximate devices;

determining, based upon at least a portion of the first identifier received from the remote source and at least a portion of the second identifier received from the proximate device, whether the proximate device is identified as an individual device belonging to the group; and causing, in an instance in which said proximate device is identified as an individual device belonging to the group based upon at least the portion of the first identifier received from the remote source and at least the portion of the second identifier received from the proximate device, a wireless short-range communication connection procedure to be initiated with the proximate device, wherein the wireless short-range communication connection procedure complies with Bluetooth or Bluetooth Low Energy communication technology.

15. The method according to claim 14, wherein the wireless short-range communication packet comprises information enabling initiation of the wireless short-range communication connection procedure with the proximate device.

16. The method according to claim 14, wherein the second identifier comprises a group portion associated with a group of devices with which the first identifier is associated.

17. The method according to claim 14, wherein the second identifier comprises an identifier compliant with Bluetooth Low Energy communication technology.

18. The method according to claim 17, wherein the second identifier received from the proximate device changes periodically or upon the occurrence of certain events.

19. The method according to claim 14, further comprising utilizing at least one service from the proximate device over a wireless short-range communication connection established with the proximate device.

20. The method according to claim 14, further comprising providing at least one service for the proximate device over a wireless short-range communication connection established with the proximate device.

21. The method according to claim 20, wherein the at least one service is available to one or more devices belong to the group of devices.

22. The method according to claim 14, further comprising determining whether at least a portion of the first identifier received from the remote source is able to be matched with at least a portion of the second identifier received from the proximate device in connection with determining whether the proximate device is identified as an individual device belonging to the group.

23. The method according to claim 14, further comprising receiving from the proximate device a connection request in accordance with Bluetooth or Bluetooth Low Energy communication technology during initiation of the wireless short-range communication connection procedure with the proximate device.

24. An apparatus comprising at least one processor and at least one memory storing computer program code, the at least one memory and the computer program code being configured to, with the at least one processor, cause the apparatus to at least:

receive a first identifier from a remote source comprising a server configured to provide cloud service;

cause the first identifier to be stored;

receive a wireless short-range communication packet comprising a second identifier, wherein the wireless short-range communication packet comprises information compliant with Bluetooth Low Energy communication technology to advertise presence of the proximate device or information compliant with Bluetooth Low Energy communication technology to respond to a scan for proximate devices; and cause a wireless short-range communication connection procedure to be initiated with the proximate device in an instance in which the proximate device is identified as an individual device belonging to a group based upon processing of at least a portion of the first identifier and at least a portion of the second identifier, wherein the initiated wireless short-range communication connection procedure complies with Bluetooth or Bluetooth Low Energy communication technology.

25. The apparatus according to claim 24, wherein the wireless short-range communication packet comprises information enabling initiation of the wireless short-range communication connection procedure with the proximate device.

26. The apparatus according to claim 24, wherein the second identifier comprises a group portion associated with a group of devices with which the first identifier is associated.

27. The apparatus according to claim 24, wherein the second identifier comprises an identifier compliant with Bluetooth Low Energy communication technology.

28. The apparatus according to claim 27, wherein the second identifier received from the proximate device changes periodically or upon the occurrence of certain events.

29. The apparatus according to claim 24, wherein at least one service is available for a group of devices via initiated short-range communication connection.

30. The apparatus according to claim 24, wherein the memory and computer program code are further configured to, with the at least one processor, cause the apparatus to determine whether at least a portion of the first identifier received from the remote source is able to be matched with at least a portion of the second identifier received from the proximate device in connection with determination whether the proximate device is an individual device belonging to the group.

31. The apparatus according to claim 27, wherein the second identifier comprises a Bluetooth Low Energy address.

32. The apparatus according to claim 24, wherein the memory and computer program code are further configured to, with the at least one processor, cause the apparatus to receive from the proximate device a connection request in accordance with Bluetooth or Bluetooth Low Energy communication technology during initiation of the wireless short-range communication connection procedure between the apparatus and the proximate device.

33. The apparatus according to claim 24 comprising one of a mobile telephone, a laptop computer, a tablet computer, a personal computer, or a gaming device.

* * * * *